United States Patent Office 3,360,824
Patented Jan. 2, 1968

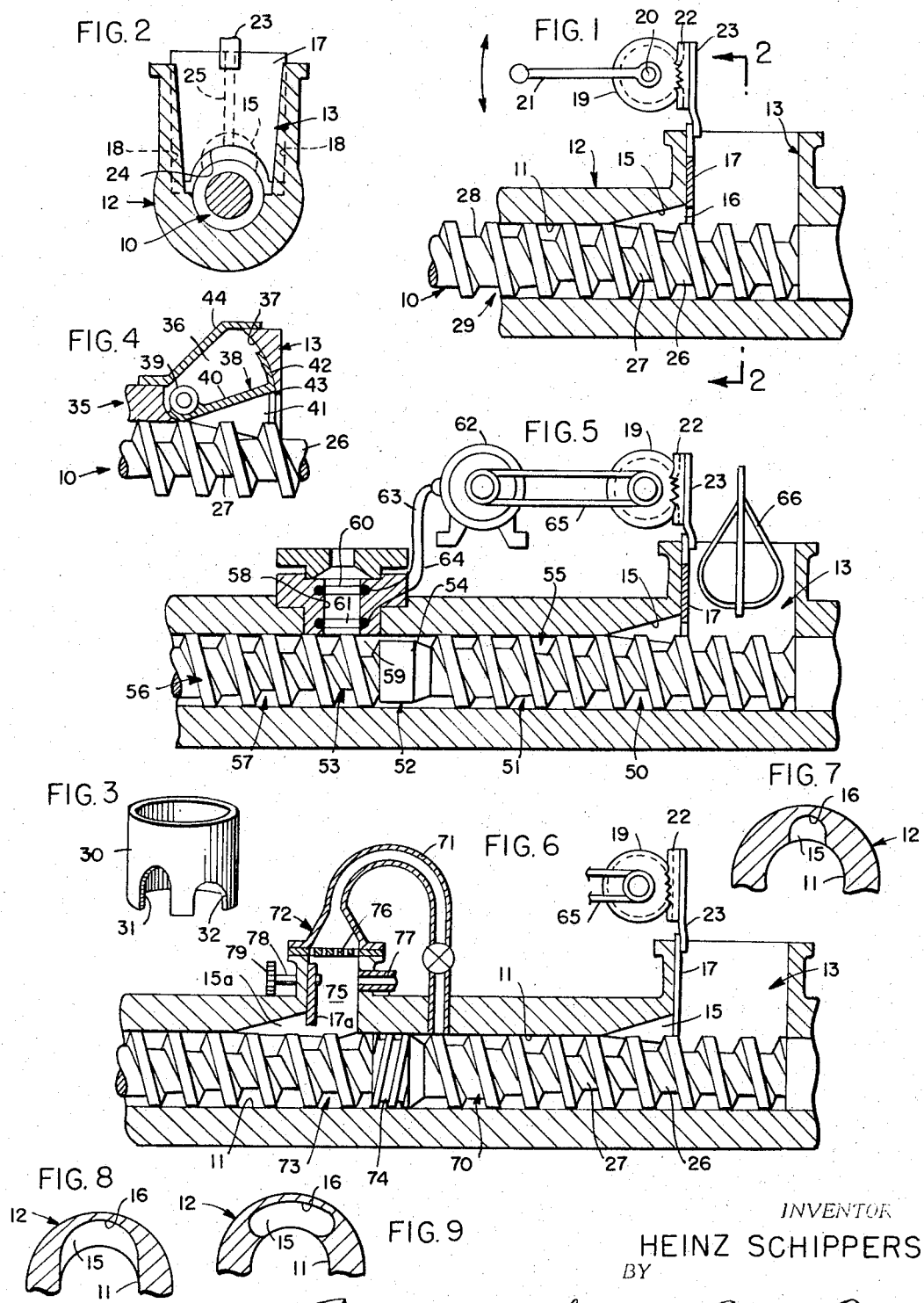

3,360,824
ROTATING SCREW DEVICES WITH DRAW-IN POCKET
Heinz Schippers, Remscheid-Lennep, Germany, assignor to Barmer Maschinenfabrik Aktiengesellschaft, Wuppertal-Oberbarmen, Germany
Filed May 26, 1966, Ser. No. 553,123
Claims priority, application Germany, June 3, 1965, B 82,248
14 Claims. (Cl. 18—12)

ABSTRACT OF THE DISCLOSURE

Rotating screw device for processing thermoplastic polymers with (1) rotatable screw in a cylindrical passage of the screw housing, (2) a draw-in pocket in the feed section of the screw housing and extending in the direction of movement of the material by the screw, the axial length of said pocket being at least equal to the pitch of the screw, and said pocket reducing in cross-section from its entrant portion to its point of merger with the cylindrical passage, (3) adjustable throttling means at said entrant portion, e.g., a slide valve across said entrant portion or a movable upper wall of the pocket, or a ring coaxially mounted in the feed section with openings of different sizes adapted to be positioned opposite the entrant portion, (4) a screw core section of necked down core diameter opposite the draw-in pocket, (5) automatic means for activating the throttling member in response to thermoplastic material flow or pressure in the screw passage, (6) an upwardly extending passage communicating with the cylindrical passage for degassing, detectors for detecting at least two levels of polymer which enters the upwardly extending passage and electric motor for moving the throttling means, and an electrical circuit operatively connecting the motor and the detectors for energizing the motor to move the throttling means in a predetermined direction to increase or decrease the amount of thermoplastic polymer fed into the draw-in pocket, (7) separate homogenizing zones in the cylindrical passage and communicating passage for conveying thermoplastic polymer externally of the cylindrical passage from the discharge end of one zone to the feed end of the next zone, pressure measuring means in the communicating passage and means for moving the throttling means in response to pressure changes in the communicating passage, and (8) passage means for venting the draw-in pocket with the atmosphere.

This invention relates to rotating screw devices for the processing of thermoplastic synthetic material with a charging pocket which extends longitudinally in the screw housing near the feed end. This pocket is of a larger cross section near the charge entrance and its length is at least that of a single lead (pitch) of the screw. This pocket starts with the largest opening near the entrant portion and gradually reduces until it blends into the circular arc for the cylindrical passage about the screw and serves the feeding of the raw material in a plastic condition or in a solid condition into the cylindrical passage.

The processing of different thermoplastic synthetic material or different materials by a screw machine with axial charging pocket leads to the disadvantage of obtaining different rates of filling and course of pressure development in the screw machine and therefore also in the quality of the production. This problem has been noticed at a change of the charge or even at a change of the quality of the same raw material while other processing conditions remain unchanged. Different moisture contents due to a longer or shorter storage of the raw material also were found to have an effect.

The subject of this invention is the elimination of this problem by use of a device for the control of the rate of filling in the screw. Certain devices are known for this purpose. They usually limit the charge by means of a valve or by dosing pumps which work sluggishly and inaccurately because they are far away from the screw in the charging section or are in the feed line, whereas the charge is subject to bridge formations or flow reductions in its feed to the screw.

Briefly, this invention provides:

(a) A rotating screw device useful for processing thermoplastic polymers comprising a screw housing having a cylindrical passage and a thermoplastic polymer feed section communicating with said passage, a rotatable screw in said passage and feed section, said screw having its spiral rib about an axial core, wall means in said housing defining a draw-in pocket extending from said feed section toward the cylindrical passage in the direction of movement of the thermoplastic polymer by the rotating screw, said draw-in pocket having its axial length at least equal to the pitch of said screw, further having an entrant portion at said feed section and reducing in cross-section from said entrant portion in said direction until it merges with the circular arc of said cylindrical passage, and adjustably movable throttling means contiguous to said entrant portion to control the amount of thermoplastic polymer fed from said feed section into said draw-in pocket;

(b) A device as described in (a), said throttling means having a movable member contiguous to said entrant portion for varying the size of the opening communicating said feed section with said draw-in pocket;

(c) A device as defined in (a), said throttling means having a wall defining a side of said pocket, and means for moving said wall to vary the volume of said pocket;

(d) A device as defined in (a), wherein said axial core has a diameter opposite said draw-in pocket which is smaller than the diameter of said core in said feed section in the vicinity of said entrant portion and is also smaller in diameter than the diameter of said core of the portion of said screw which is downstream from said draw-in pocket;

(e) A device as defined in (a), and means for activating said throttling member in response to the rate of flow of thermoplastic polymer through said passage;

(f) A device as defined in (a), and means for activating said throttling member in response to the pressure in said passage.

(g) A device as defined in (a), upwardly-extending passage means communicating with said cylindrical passage for degassing said passage, detecting means for detecting at least two levels of said thermoplastic polymer which enters said passage means, a reversible motor, means operatively connecting said motor with said throttling means, and means operatively connecting said motor and said detecting means for energizing said motor to rotate in a predetermined direction and thereby move said throttling means to increase or decrease the amount of thermoplastic polymer fed into said draw-in pocket;

(h) A device as defined in (a), means dividing said passage into axially separate homogenization zones, communicating passage means for conveying said thermoplastic polymer externally of said cylindrical passage, from the discharge end of one zone to the feed end of the next zone, means for measuring the pressure in said communicating passage means, and means for moving said throttling means in response to pressure changes in said communicating passage means;

(i) A device as defined in (a), said throttling means comprising a vertically movable plate mounted in said feed section across said entrant portion;

(j) A device as defined in (a) and (i), and rack and pinion means operatively connected to said plate for effecting vertical movement thereof;

(k) A device as defined in (a), said feed section comprising a vertical conduit member on said housing and intersecting the feed end of said cylindrical passage, and means adjustably movably mounting said throttling means in said conduit member;

(l) A device as defined in (a) and (k), said throttling member comprising a ring coaxially mounted in said conduit member, and said ring having openings of different sizes adapted to be positioned selectively opposite said entrant portion;

(m) A device as defined in (a), and passage means venting said draw-in pocket with the atmosphere; and (n) A device as defined in (a) and (m), wherein said last-mentioned means comprises a gas passage in said throttling means communicating said pocket with the atmosphere.

According to this invention, it is important to obtain an accurate and delay free control of the material in the immediate area of the charging pocket in the space between the screw core and cylinder wall of the screw passage. A screw press with charging or draw-in pocket extending in the longitudinal or axial direction near the entrance of the screw cylinder has a hood, slide or similar throttling device which varies the effective fill volume of the charging pocket and/or the entrant cross section of the charging or draw-in pocket. This variable throttling device facilitates control of the amount of material to be drawn into the charging pocket and therefore regulates the degree of fill in the screw. The larger the variable entrance cross section of the charging pocket in relation to the ring shaped space between screw core and cylindrical passage, the finer and the more accurate is the control. Therefore, it is further suggested that the diameter of the screw core in the area opposite to the throttling member be made larger than the screw core diameter opposite the charging pocket, i.e., the screw core diameter in the area of the throttling member that is about the same as the screw core diameter downstream from the charging pocket (the homogenizing zone), and the change from a larger to a smaller core diameter is in the area opposite the charging pocket. Depending upon the operational requirements, the control can be manual, or the control mechanism and thus the position of the throttling member for the charging pocket can be automatically adjusted depending on the thermoplastic polymer volume or the pressure in the extruder.

Of particular importance is an arrangement provided for the control of the rate of filling of the screw of presses for the degassing of polymer melts, especially extrusion presses with multiple stage screws in tandem arrangements. Those presses are designed and arranged for the elimination of air or moisture. These undesired materials are usually removed in the area of complete plasticitation in the screw passage. The function of these machines usually require two screw stages in axial, tandem design, so that the material is first drawn in, charged and compressed in the first stage. After a following pressure release, it is again drawn in, charged through the second stage and pressed through the extrusion die. This process can be described as a double draw with a primary fill and a secondary refill zone. The rate of filling of the screw in each corresponding screw stage and the charge rate depends on these zones.

Another aspect of this invention involves a throttling device on an adjustable draw-charging pocket in the primary fill and/or in the refill zone in a multiple stage screw press where the screws are in a tandem arrangement and with a degassing system where the position of the throttling member or throttling members depends on the level of the melt in the degassing pipe, said level being dependent on the polymer charging rate or depends on the pressure at the end of the last screw stage and/or the pressure in the melt-conveying line between the first homogenizing zone and the second refill zone, which line leads through a degassing device.

The adjustment of the throttling device can be facilitated by a reversible control motor. A melt level detector or meter, especially one of an inductive or capacitive type, in the degassing line of a degassing extruder sends the control impulses to this control motor.

The throttling member and its mounting can be arranged in the fill pipe and can be in the form of a movable wall, slide member or valve, etc. Further, the throttling member can be the movable wall of the charging pocket and be of such design that a movement of the throttling member changes the volume of the draw-in pocket. The throttling element can also be located in the polymer feed conduit in the form of a coaxial, rotatable ring (or a portion of a ring) with openings of varying cross section. The throttling device, especially slide members, can be actuated by a rack.

In certain cases it is of advantage to add a vent pipe which is connected to the throttling member and lets air escape to the atmosphere when the material is compressed. This has proven advantageous in the processing of powdered or granulated thermoplastic polymers, e.g., particles of solid polypropylene.

The drawings show several preferred embodiments of the subject invention.

In the drawings:

FIGURE 1 is a vertical section of the feed end of a single screw extruding press with tapered draw-in pocket extending in axial direction and with an adjustable throttling member in the fill pipe for an adjustment of the opening into the entrant portion draw-in pocket;

FIGURE 2 is a cross section taken on section plane 2—2 of FIGURE 1;

FIGURE 3 is a perspective view of a throttling member which is a rotatable ring with different size openings or passages;

FIGURE 4 is a cross section of the feed end of a screw extruding press with a throttling member in the form of a hood defining a movable wall of the draw-in pocket;

FIGURE 5 is a section of a fragment of a hot melt screw extruder with draw-in pocket and adjustable throttling member which adjusts automatically depending on the melt level in a degassing line;

FIGURE 6 is a section of a fragment of an extruder with a two stage screw in tandem arrangement with respective draw-in pockets, each having a throttling member; and FIGURES 7, 8 and 9 each are transverse sections of the upper half of the screw housing at the entrant portion of the draw-in pocket and respectively show various shapes of said pocket.

FIGURE 1 shows a screw 10 in the cylindrical passage 11 of screw housing 12. The housing has a fill conduit or cylindrical feed section 13. The cylindrical passage 11 intersects the fill pipe or feed section 13. At the intersection, a tapered draw-in pocket 15 has a transverse cross section that tapers or decreases axially in the direction of the material movement. The top wall of the pocket 15 slopes toward the axis of screw 10 until it merges with the cylindrical passage 11. The pocket 15 may have a uniform width or its width may taper in the direction away from entrant portion 16. Various, illustrative transverse shapes of the pocket 15 are shown in FIGURES 1, 7, 8 and 9. The cross section of the entrant portion 16 can be varied by means of the slide plate or slide valve 17. The slide member 17 slides vertically in the vertical grooves 18 in the fill pipe 13 and is activated by rotating the pinion 19 which turns on the fixed shaft 20. The pinion 19 has a pivot arm 21 for manual rotation thereof and meshes with the rack 22. The latter is connected by bracket or bar 23 to the slide member 17. Movement of the latter is initiated by pivoting of the arm 21.

The lower edge of slide member 17 has an upwardly arched segment 24 defining the upper side of the opening at the entrant portion of pocket 15. For venting air from the pocket a groove 25 (FIG. 2) extends from the arched lower edge to the atmosphere in the side of slide member 17 facing said pocket.

The core 26 of the screw portion opposite the slide member 17 is of a larger diameter than the core 27 of the screw portion opposite the pocket 15. The reason is more effective control of material flow. The diameter of the core 27 is about the same as the diameter of the screw core 28 in the homogenizing zone 29. The screw core is thus necked down in the zone of the draw-in pocket 15.

FIGURE 4 shows another embodiment, wherein the throttling element is in the form of a movable wall defining a side of the draw-in pocket. The screw housing 35 has a cavity 36 having a curved wall 37 opposite feed section or fill pipe 13. A movable throttling member 38 is pivotally mounted by hinge 39 in the cavity 36. It comprises a wall 40 having the form of a flat or curved plate. Wall 40 defines the upper wall of the draw-in or changing pocket 41 and is movable toward and away from the screw 10 to vary the volume and taper of the pocket. An upstanding, curved flange 42 on the outer, swinging end of wall 40 slides over curved wall 37, and said end may further have a depending lip 43 which defines the upper edge of the entrance to pocket 41. The throttle member 38 may be positioned manually by removing the cover plate 44 over cavity 36 and pivoting said member by hand. It may be locked in the desired position by suitable means (not shown), e.g., by pins, bolts, etc., or it may be moved mechanically by mechanisms herein described for other embodiments through elements connected to plate 40 or to hinge 39.

FIGURE 5 shows a two stage degassing screw extruder of generally known design. It comprises a draw-in zone 50 following the material feed section 13, a compression zone 51, a homogenizing zone 52 and a decompression zone 53 at the end 54 of the first screw stage 55 with a degassing zone 59 at decompression zone 53 between the first screw stage 55 and the second screw stage 56. The latter embodies a recompression zone 57 and an exit zone (not shown).

A degassing passage 58 in a degassing plug communicates with the degassing zone 59 and is under atmospheric pressure or under vacuum. In the degassing line there is a commercially available capacitance type (condenser) melt level meter 60, 61 for sensing or detection of the particular level of the polymer material in the opening 58. This meter sends control impulses to the reversible electric motor 62 via conductors 63 and/or 64. The reversible motor 61 drives the belt 65, the pinion 19, the rack 22 and the throttle member 17 in a manner whereby an increase in material level in the passage 58 reduces the entry cross section of the draw-in pocket by a certain amount and increases said cross-section again when the level drops. This prevents an exit of the molten material through the degassing line and thus a plugging of this line.

It is advantageous in embodiments with automatically responsive throttle members to install a stirring device in the fill pipe or feed section 13 to increase the sensitivity of response of the throttle member. A driven stirrer 66 can be so installed that it projects into the material, particularly powdered or granulated material and so prevent a possible bridge formation of the material.

FIGURE 6 shows a screw press with a multiple stage screw in a tandem arrangement. The plastic mass leaves the cylindrical passage 11 at the end of the first screw stage 70 and flows externally of said passage via line 71 and through a degassing device 72. The material then enters the next screw stage 73 in the degassed condition. Such an arrangement of an extrusion press features two draw-in zones with adjustable draw-in pockets 15 and 15a at the feed ends in the first screw stage 70 and in the second screw stage 73, respectively. A blocking screw segment 74 with threads of the opposite hand is provided between the two stages. This prevents spill from the first stage to the second stage and assures passage of the entire charge from the first stage through the degassing device 72. This degassing device consists in the illustrated example in general of a passage 75 which communicates with cylindrical passage 11. The passage has a large volume. The melt enters through a sieve 76 and is allowed to expand in passage 75. A vacuum is drawn in passage 75 by vacuum line 77.

The entrant cross section of the draw-in pocket 15a can be adjusted in the same way as described above by means of a vertically adjustable plate. This adjustment can be made dependent on the level in the draw-in zone of the second stage. The melt level meter behind or after the degassing device and the control motor is not shown in FIG. 6 in order to keep the drawing simple. Reference is made to FIG. 5 for these features. The entrant cross section of the draw-in pocket 15a also can be adjusted by means of the eccentrically pivotable disc 17a which is mounted on rotatable shaft 78. The shaft 78 has a pinion 79 on the outer end and projects through a sealed opening in the wall of the passage 75. Pinion 79 can be activated like the activation of pinion 19 in FIG. 5. The adjustment of the pocket 15a can be initiated by response to the level of the melt or by response to the exit volume or by the pressure at the end of the second screw stage 73 by use of the same control device and by control impulses to a reversible motor substantially as shown in FIG. 5.

The decided advantage of the draw-in pocket adjustments herein described lies in the ease of processing thermoplastic polymer materials that are otherwise difficult to handle. Even in a screw press of conventional design, good results can be achieved without the need of replacing the screw to obtain a certain screw characteristic.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A rotating screw device useful for processing thermoplastic polymers comprising a screw housing having a cylindrical passage and a thermoplastic polymer feed section communicating with said passage, a rotatable screw in said passage and feed section, said screw having its spiral rib about an axial core, wall means in said housing defining a draw-in pocket extending from said feed section toward the cylindrical passage in the direction of movement of the thermoplastic polymer by the rotating screw, said draw-in pocket having its axial length at least equal to the pitch of said screw, further having an entrant portion at said feed section and reducing in cross-section from said entrant portion in said direction until it merges with the circular arc of said cylindrical passage, and adjustably movable throttling means contiguous to said entrant portion to vary the size of the opening into said pocket at said entrant portion and thereby control the amount of thermoplastic polymer fed from said feed section into said draw-in pocket.

2. A rotating screw device as claimed in claim 1, said throttling means having a movable member extending across to said entrant portion for varying the size of the opening communicating said feed section with said draw-in pocket.

3. A rotating screw device as claimed in claim 1, said throttling means having a movable wall defining the upper side of said pocket, and means for moving said wall to vary the volume of said pocket.

4. A rotating screw device as claimed in claim 1 wherein said axial core has a diameter opposite said draw-in pocket which is smaller than the diameter of said core in said feed section in the vicinity of said entrant portion and is also smaller in diameter than the diameter of said core of the portion of said screw which is downstream from said draw-in pocket.

5. A rotating screw device as claimed in claim 1, and means for activating said throttling member in response to the rate of flow of thermoplastic polymer through said passage.

6. A rotating screw device as claimed in claim 5, upwardly-extending passage means communicating with said cylindrical passage for degassing said passage, detecting means for detecting at least two levels of said thermoplastic polymer which enters said passage means, a resersible motor, means operatively connecting said motor with said throttling means, and means operatively connecting said motor and said detecting means for energizing said motor to rotate in a predetermined direction and thereby move said throttling means to increase or decrease the amount of thermoplastic polymer fed into said draw-in pocket.

7. A rotating screw device as claimed in claim 1, and means for activating said throttling member in response to the pressure in said passage.

8. A rotating screw device as claimed in claim 1, means dividing said passage into axially separate homogenization zones, communicating passage means for conveying said thermoplastic polymer externally of said cylindrical passage, from the discharge end of one zone to the feed end of the next zone, means for measuring the pressure in said communicating passage means, and means for moving said throttling means in response to pressure changes in said communicating passage means.

9. A rotating screw device as claimed in claim 1, said throttling means comprising a vertically movable plate mounted in said feed section across said entrant portion.

10. A rotating screw device as claimed in claim 9, and rack and pinion means operatively connected to said plate for effecting vertical movement thereof.

11. A rotating screw device as claimed in claim 1, said feed section comprising a vertical conduit member on said housing and intersecting the feed end of said cylindrical passage, and means adjustably movably mounting said throttling means in said conduit member.

12. A rotary screw device as claimed in claim 11, said throttling member comprising a ring coxially mounted in said conduit member, and said ring having openings of different sizes adapted to be positioned selectively opposite said entrant portion.

13. A rotating screw device as claimed in claim 1, and passage means venting said draw-in pocket with the atmosphere.

14. A rotating screw device as claimed in claim 13 wherein said last-mentioned means comprises a gas passage in said throttling means communicating said pocket with the atmosphere.

References Cited

UNITED STATES PATENTS

| | | | |
|---|---|---|---|
| 1,833,064 | 11/1931 | Baumann | 230—115 |
| 1,992,716 | 2/1935 | Paxton | 222—55 |
| 2,343,707 | 3/1944 | Roland | 198—64 X |
| 2,411,971 | 12/1946 | MacMillin et al. | 18—12 |
| 2,422,722 | 6/1947 | Fielitz | 18—12 |
| 2,668,325 | 12/1954 | Goodwin | 18—30 |
| 2,836,851 | 6/1958 | Holt | 18—12 |
| 2,947,030 | 8/1960 | Varn | 18—12 |
| 3,028,833 | 4/1962 | Hummel | 18—12 |
| 3,115,276 | 12/1963 | Johanningmeier | 222—413 X |
| 3,182,969 | 5/1965 | Rupp | 259—9 X |
| 3,191,233 | 6/1965 | Linderoth | 18—30 |
| 3,215,408 | 11/1965 | Hansen | 259—9 |

SAMUEL F. COLEMAN, *Primary Examiner.*